United States Patent Office 3,492,082
Patented Jan. 27, 1970

3,492,082
GRAFT COPOLYMERS AND METHODS OF PREPARATION THEREOF
Wing Kai Lee, Hackensack, N.J., assignor to J. P. Stevens & Co., Inc., New York, N.Y., a corporation of Delaware
No Drawing. Filed Nov. 15, 1965, Ser. No. 507,644
Int. Cl. D06p *13/28*
U.S. Cl. 8—120                16 Claims

ABSTRACT OF THE DISCLOSURE

Graft polymers of olefinic monomers and hydroxyl-containing polymers such as cellulose and its derivatives, containing little or no homopolymer are produced by, in sequence, esterifying a hydroxyl-containing polymer, e.g., cellulose, especially in a textile form, to produce a sulfonate ester, converting the resulting product to a hydroperoxide by reaction with a peroxide, and reaction of the resulting hydroperoxidized polymer with a reactive monomer, e.g., an olefinic monomer, to yield the desired graft polymer.

---

The present invention relates to graft copolymers having a backbone formed from a hydroxyl-containing polymer, and also relates to methods of preparation thereof. More particularly, the present invention relates to a process for grafting chains on a backbone formed from cellulose and to the grafted copolymer so produced.

The subject of graft copolymers has been of continuing interest in recent years because such materials are possessed of unique and distinctive combinations of properties. Thus, it is possible to start with a host polymer or backbone having one set of desired properties and impart a second set of desired properties by grafting chains of a different organic structure. Alternatively, certain of the properties of the backbone may be masked or eliminated by the attachment of graft chains.

Ideally, a process for producing graft copolymers should result in the attachment or grafting of a relatively large number of graft chains of controlled molecular weight, as compared to the undesirable graft copolymer structure in which relatively few graft chains of high molecular weight are spaced far apart along the backbone. In addition, such an ideal process is one in which relatively little or no unattached homopolymer is formed during polymerization of the graft monomer.

A complicating factor in the production of graft copolymers using fibrous cellulose or cellulose derivatives as the host polymer or backbone, is the limited resistance to chemical degradation exhibited by such materials. For this reason, many theoretically feasible processes for the production of graft copolymers using a cellulose or cellulose derivative backbone are unsatisfactory from a practical point of view because the fibrous structure of the cellulosic material would be disintegrated or otherwise adversely affected by the proposed treatment.

In view of the foregoing, it is an object of the present invention to provide a process for the production of graft copolymers comprising a backbone formed from a hydroxyl-containing polymer.

It is a further object of the present invention to provide a process for the production of graft copolymers comprising a backbone formed from cellulose.

Another object of the present invention is to provide graft copolymers comprising a backbone formed from a hydroxyl-containing polymer.

Briefly stated, one embodiment of the present invention is a method for the production of graft copolymers having a backbone formed from cellulose comprising the steps of treating said cellulose with an esterification reagent selected from the group consisting of alkyl sulfonyl chlorides and aryl sulfonyl chlorides to convert hydroxyl groups of said cellulose to sulfonate groups; reacting the cellulose so treated with hydrogen peroxide to form cellulose hydroperoxide; and contacting the cellulose hydroperoxide with a polymerizable olefinic monomer under polymerizing conditions to form a graft copolymer.

Although the present invention may be suitably practiced using any hydroxyl-containing polymer to form the backbone, the description set forth below is in terms of the use of cellulose. It is to be understood that cellulose derivatives and any other hydroxyl-containing polymers will react similarly in the process of the present invention to provide the desired graft copolymers.

The first step in the present invention comprises esterification of the host polymer or backbone, in this case cellulose, with an alkyl, or aryl sulfonyl chloride to convert hydroxyl groups to sulfonate groups. This type of reaction is discussed in detail in an article in Textile Research Journal, vol. 32, pp. 797–804 (1962). When toluene sulfonyl halides are used, the reaction is termed tosylation and the product thereof is termed tosylated cellulose. A typical esterification reaction between p-toluenesulfonyl chloride and cellulose is as follows:

Cell—OH+p—CH$_3$C$_6$H$_4$SO$_2$Cl→
    Cell—O—SO$_2$C$_6$H$_4$CH$_3$—p+HCl    (1)

Cellulose and other hydroxyl-containing polymers may be esterified by an organic sulfonyl chloride according to Equation 1 above, in the presence of alkali metal hydroxide or tertiary nitrogen base, e.g., pyridine, which serves as acid acceptor for the HCl which is liberated. Phenyl-, p-toluene- and methyl sulfonyl chlorides are the preferred reagents for this reaction.

The esterification is conducted in a heterogeneous or a homogeneous system, depending on the solubility of the hydroxyl-containing polymer. In the case of fibrous cellulose, which does not dissolve without degradation, the esterification is conducted in a heterogeneous system.

The esterification of fibrous cellulose is facilitated by swelling the fibers to increase the extent of reactant penetration. To this end, a non-interfering swelling solvent is incorporated into the reaction medium. Of the commonly used swelling solvents for cellulose-water, N,N'-dimethyl formamide and pyridine, N,N'-dimethylformamide is a good solvent which swells the cellulose and aids the penetration of the reactants; and pyridine is preferred because it also serves as an acid acceptor to prevent undue degradation to the cellulose fiber.

The temperature used for the esterification can be varied from —50° C. to 70° C. At the lower end of this range, the reaction rate is quite low, whereas temperatures near the upper limit increase the possibility of degradation of the polymer. Temperatures in the range 20° to 50° C. are preferred, since an acceptable reaction rate obtains without excessive degradation.

The duration of the esterification reaction is selected to provide the desired degree of substitution of the hydroxy group.

The proportional extent of substitution of sulfonate groups for hydroxyl groups may be determined by analyzing for weight percent sulfur by standard methods of analysis and converting this figure to what is termed in the art "DS" in the following manner:

$$DS = \frac{1.62(\%S)}{32 - 1.54(\%S)} \quad (2)$$

where "1.62" is the molecular weight of a repeating anhydro-glucose unit divided by 100; "32" is the molecular weight of sulfur; "1.54" is the molecular weight of the substituent p-toluene sulfonyl group divided by 100;

and "percent S" is the sulfur content expressed in weight percent.

As will be discussed below, the sulfonate groups which replace hydroxyl groups during this reaction are believed to be the locations for eventual sites at which graft chains may attach to the backbone. Desirably, the number of such replacements should be maximized. However, in achieving this desideratum, care must be taken to avoid side effects which can occur if the reaction is permitted to proceed too far.

For the purposes of this invention, it is desirable to react the cellulose with the sulfonyl chloride to obtain a DS of at least 0.02. If lesser values of DS are obtained, there will be too few sites at which graft chains may attach. Values of DS in the range of 0.10 to 0.20 are preferred for the present invention. Although there is no maximum DS which is dictated by the requirements of the present process, at values of DS above 0.30, the physical and chemical properties of the cellulose begin to be adversely affected.

The next step in the process of the present invention involves reacting the tosylated cellulose with a peroxide to form cellulose hydroperoxide. This type of reaction is discussed for tosylates of simple alcohols in Journal of the American Chemical Society, vol. 76, pp. 2984–2990, 1954. Preferably, this reaction is conducted at ambient temperature in a solution of aqueous hydrogen peroxide and potassium hydroxide. Such reaction is shown below:

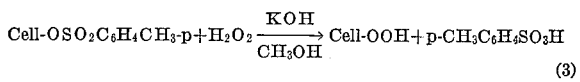

(3)

Mixtures of water and methanol are the preferred solvent systems for reaction (3). The source of peroxide may be hydrogen peroxide or alkaline peroxide compounds such as sodium or potassium peroxide. If aqueous hydrogen peroxide is employed, concentrations from about 10% to 50% by weight are suitable, and though a stoichiometric amount of peroxide is sufficient, a slight excess is preferred.

Reaction of hydrogen peroxide with the tosylated cellulose involves the formation of $p\text{-}CH_3C_6H_4SO_2O^-$ anions as the leaving groups. Such anions hydrolyze to form the strong acid p-toluene sulfonic acid which can attack the hydroperoxide formed. To avoid this undesirable side reaction, an excess of alkali metal hydroxide is used to insure complete neutralization of the acid formed. Generally, the pH of the hydroperoxidation solution should be above 12, and the basicity of the solution is chiefly governed by the molar ratio of the base to the tosyl groups present.

Reaction (3) can be accompanied by a hydrolysis reaction as shown below:

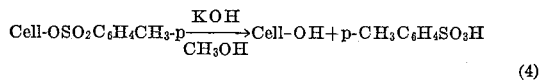

(4)

Reaction (3) is preferably conducted at lower temperatures, of the order of 25° C. to minimize the hydrolysis reaction (4). Lower reaction temperatures are also preferred to avoid thermal decomposition of the hydroperoxide product of reaction (3).

The duration of the hydroperoxidation is governed by the extent of reaction desired. The approximate rate of formation of cellulose hydroperoxide may be judged by the rate of disappearance of the base (e.g., KOH), assuming that reaction (4) is minimized.

The following two examples show that the product of reaction (3) contains peroxide groups.

EXAMPLE 1

The p-toluene sulfonyl ester of cellulose (tosylated cellulose) was prepared as follows. A length of cotton fabric (80 x 80 print cloth) weighing 220.0 g. was wrapped around a perforated glass pipe which was immersed and rotated in a long cylinder containing 800.0 g. of p-toluene sulfonyl chloride dissolved in 3300.0 g. pyridine. The reaction was kept at ambient temperature of the order of 25° C. After 22 days, a sample of the cotton fabric was withdrawn. It was determined that the fabric had a sulfur content of 4.10% by weight, which calculates to a DS of 0.26.

The tosylated fabric thus obtained was hydroperoxidized as follows. Two 1.0 gram tosylated cellulose fabric samples were separately immersed in 5.0 cc. of methanol in two 250 cc. flasks. Into one flask were added 2.0 cc. of 35% $H_2O_2$ and 2.0 cc. of 10% aqueous potassium hydroxide, while into the other were added 2.0 cc. of water and 2.0 cc. of 10% aqueous potassium hydroxide. The two flasks with the contents were kept at 25° C. for 16 hours. Titration of the solutions with standard HCl to a phenolphthalein end point indicated that 0.70 meq. KOH was consumed when hydrogen peroxide was present and 0.40 meq. in the absence of hydrogen peroxide. The difference of 0.30 meq. was taken to measure the amount of cellulose hydroperoxide formed and this was confirmed by iodometric titration after the neutralized fabric was washed thoroughly in water.

EXAMPLE 2

Two 2.0 gram cellulose fabric samples, one tosylated (DS=0.25) and the other untreated, were immersed in 20 cc. methanol containing 8.0 cc. 35% hydrogen peroxide and 8.0 cc. 10% aqueous potassium hydroxide for a period of 16 hours at 25° C. The two samples were washed thoroughly in water, treated with dilute acetic acid and then finally with water until the washings were neutral. The two samples, together with a tosylated sample (2.0 g. in weight), were separately placed in three 250 cc. Erlenmeyer flasks.

The three fabric samples (cut to small pieces) were analyzed for iodine formation, a method for the estimation of organic peroxide (S. Siggia, "Quantitative Organic Analysis, 3rd ed., pp. 255–262, John Wiley & Sons, Inc., New York, 1963). Into the three flasks containing the fabric samples were added 40 ml. anhydrous isopropanol, 2 ml. glacial acetic acid and 10 ml. of isopropanol saturated with sodium iodide. The solutions were gently refluxed for 15 minutes and the solution, containing the tosylated fabric which had been immersed in hydrogen peroxide for 16 hours turned into a deep yellow color while no color was visible for the other two solutions.

The yellow color developed in the solution containing the cellulose hydroperoxide was made invisible upon adding aqueous sodium thiosulfate. Hence, the tosylated fabric which had been treated with hydrogen peroxide was shown to liberate iodine, an indication of the formation of organic peroxide in the fabric.

The foregoing examples illustrate that only the cellulose material which is both tosylated and then treated with peroxide in the manner of the present invention contained peroxide groups.

The final step in the preparation of graft copolymers in accordance with the present invention is the production of a graft copolymer in which the cellulose serves as the host polymer or backbone. For purposes of illustration, it is assumed that the graft chains are to be formed from a polymerizable olefinic monomer such as acrylonitrile. In this step, the peroxide groups in the cellulose serve as polymerization initiators, thereby causing the acrylonitrile to polymerize. Although no confirming data is at hand, it is believed that the locations of peroxide radicals are the sites at which the graft chains, in this instance acrylonitrile polymers, attach to the backbone.

The action of the peroxide groups in initiating the polymerization reaction is well known and is described in many current publications. (See, for example, High Polymers, Interscience Publishers, 1955, vol. 9, pp. 63–67.)

The hydroperoxide is induced to generate the free radicals or polymerization initiating radicals by thermal activation, or alternatively, the necessary free radicals are formed by the addition of a reducing agent to form a redox system. (See High Polymers, ibid., pp. 71–73.)

The step of forming the graft copolymer may be conducted in the liquid phase using a solvent for the polymerizable monomer. Preferably, the solvent should be capable of swelling the cellulose or host polymer to improve the penetration of the polymerizable monomer.

Alternatively, the graft copolymer may be formed by a vapor phase reaction in which the polymerizable monomer in the vapor state is contacted with the host polymer. The polymerization may be carried out at the boiling point of the monomer and, for volatile materials, under pressure. It may be advantageous to dilute the monomer vapor with water vapor to swell the substrate for better penetration.

The following examples illustrate various embodiments of the present invention.

EXAMPLE 3

Two 2.0 g. cellulose fabric samples, one tosylated (DS=0.25) and the other untreated, were immersed in 20.0 cc. methanol containing 8.0 cc. 35% hydrogen peroxide and 8.0 cc. 10% aqueous potassium hydroxide for a period of 16 hours at 25° C. The two samples were washed thoroughly in water, treated with dilute acetic acid and then finally washed with water until the washings were neutral. The samples were blotted dry. The two samples, together with a tosylated sample which had not been further treated, were placed in a three-necked flask equipped with a reflux condenser, a thermometer, a dropping funnel and a nitrogen-gas inlet tube. After passing dry nitrogen into the flask containing the fabric samples, 200 cc. of 10% aqueous acrylonitrile were added. The reaction flask was then immersed into a constant temperature bath maintained at 65–70° C. for 2 hours. The acrylonitrile solution was clear throughout the reaction time. The samples were first washed thoroughly in N,N'-dimethylformamide and were then extracted with N,N'-dimethylformamide at 80° C. for 2 hours. The percent weight gain of the three samples obtained were as follows:

| Sample | Percent Weight Gain | |
|---|---|---|
| | Before Extraction | After Extraction |
| Tosylated | 0 | |
| Untreated-peroxide treated | 0 | |
| Tosylated-peroxide treated | 38.8 | 35.10 |

EXAMPLE 4

A 2.0 gram tosylated cellulose fabric (DS=0.25) and a 2.0 gram untreated cellulose fabric were treated with hydrogen peroxide in the manner described in Example 2.

The two fabric samples, together with a tosylated sample, were reacted with styrene as with acrylonitrile described in Example 2, except that the styrene was emulsified in the aqueous solution of 0.24 g. potassium oleate. After the reaction time of two hours, the treated samples were washed in benezene and then Soxhlet-extracted with benzene for 2 hours.

The percent weight gain obtained of the three samples from treatment with styrene monomer was:

| Sample | Percent Weight Gain | |
|---|---|---|
| | Before Extraction | After Extraction |
| Tosylated | 2.10 | 1.37 |
| Untreated-peroxide treated | 0 | |
| Tosylated-peroxide treated | 21.40 | 21.10 |

EXAMPLE 5

A 2.0 gram tosylated cellulose fabric (DS=0.25) and a 2.0 gram untreated cellulose fabric were treated with hydrogen peroxide by the method explained in Example 2.

The two fabric samples, together with a tosylated sample were reacted with 10% aqueous methyl methacrylate by the procedure used with acrylonitrile and described in Example 2. After a reaction time of 2 hours, the treated sample was washed and then Soxhlet-extracted with benzene for 2 hours.

The percent weight gain of the three samples obtained from treatment with methylmethacrylate was:

| Sample: | Percent weight gain |
|---|---|
| Tosylated | 0 |
| Untreated-peroxide treated | 0 |
| Tosylated-peroxide treated | 5.49 |

EXAMPLE 6

A 3.0 gram tosylated cellulose fabric (DS 0.25) and a 2.0 gram untreated cellulose fabric were treated with hydrogen peroxide by the method explained in Example 2.

The two fabric samples, together with tosylated sample, were reacted with 60.0 grams of 30% aqueous N-vinyl pyrrolidone solution containing 1.0 g. ammonium hydroxide in the manner described in Example 2. After a reaction time of 2 hours at 50° C., the fabric was washed and extracted in boiling water for 2 hours.

The percent weight gain of the three samples obtained was:

| Sample | Percent Weight Gain | |
|---|---|---|
| | Before Extraction | After Extraction |
| Tosylated | 0 | |
| Untreated-peroxide treated | 0 | |
| Tosylated-peroxide treated | 6.93 | 4.63 |

EXAMPLE 7

Tosylated cellulose fabric of different degrees of substitution of sulfonic ester group were prepared according to the method used by Schwenker et al. (Textile Research Journal, 32, 797 (1962)).

Samples of the tosylated cellulose fabric were hydroperoxidized in the manner described in Example 1, using 5.0 parts of methanol, 2.0 parts of 35% hydrogen peroxide and 2.0 parts of 10% potassium hydroxide per part of fabric sample.

The washed and air-dried fabric samples were reacted 400.0 parts of 10% aqueous acrylonitrile as described in Example 2. The treated samples were washed thoroughly in N,N'-dimethylformamide and then extracted in N,N'-dimethylformamide at 80° C. for 2 hours.

| Sample | | Percent Weight Gain of Treated Fabric |
|---|---|---|
| Percent S | DS | |
| 1.52 | 0.09 | 28.5 |
| 2.80 | 0.17 | 38.9 |
| 4.10 | 0.25 | 42.2 |

EXAMPLE 8

Five 2.0 g. tosylated cellulose fabric samples (DS 0.09) were hydroperoxidized as described in Example 1 for ½ hour, 1 hour, 2 hours, 5 hours and 16 hours at 25° C. The five fabric samples were washed thoroughly in water, treated with dilute acetic acid and finally washed thoroughly in water. The five air-dried samples were reacted together with 400.0 g. of 10% aqueous acrylonitrile under nitrogen in a flask at 65° C. for 2 hours. The treated samples were washed thoroughly in N,N'-dimethylformamide at 80° C. for 2 hours. The percent weight gain of the five samples treated with acrylonitrile was:

| Sample hydroperoxidized with 35% $H_2O_2$ for (hr.): | Percent weight gain of treated fabric |
|---|---|
| 0.5 | 8.2 |
| 1.0 | 11.1 |
| 2.0 | 13.7 |
| 5.0 | 19.8 |
| 16.0 | 23.8 |

EXAMPLE 9

A 3.0 g. tosylated cellulose fabric (2.8% S, DS 0.17) and a 2.0 g. untreated cellulose fabric were hydroperoxidized by the method described in Example 2. The two fabric samples were reacted with 200.0 g. of 10% aqueous acrylonitrile containing 1.0 g. of ferrous ammonium sulfate under nitrogen at 45° C. for 2 hours.

The treated samples were washed thoroughly in N,N'-dimethylformamide and were extracted with N,N'-dimethylformamide at 80° C. for 2 hours. The percent weight gain of the samples treated with acrylonitrile using a redox system was:

| Sample: | Percent weight gain |
|---|---|
| Untreated-peroxide treated | 0 |
| Tosylated-peroxide treated | 7.2 |

EXAMPLE 10

A 2.5 g. tosylated cellulose fabric (2.8% S, DS 0.17) was hydroperoxidized by the method described in Example 2. The hydroperoxidized fabric was mounted over 100 g. of 50% aqueous ethyl acrylate in a 2-liter resin kettle equipped with a reflux condenser, a thermometer and a nitrogen gas inlet. The solution was heated gently to 95° C. under a nitrogen blanket for 2 hours. The treated sample was washed thoroughly in benzene and was Soxhlet-extracted with benzene for 2 hours. The benzene rinsed fabric was dried and was found to have a weight gain of 12.9%.

EXAMPLE 11

A 2.5 g. tosylated cellulose fabric (2.8% S, DS 0.17) and a 2.0 g. untreated cellulose fabric were hydroperoxidized by the method described in Example 2. The two fabric samples were reacted with 200.0 g. 10% aqueous acrylic acid at 70° C. under nitrogen for 2 hours. The samples were washed thoroughly in water and were extracted in boiling water for 2 hours. The treated samples were dried and the percent weight gain obtained was:

| Sample: | Percent weight gain |
|---|---|
| Untreated-peroxide treated | 7.9 |
| Tosylated-peroxide treated | 64.6 |

EXAMPLE 12

A 2.5 g. tosylated cellulose fabric (2.8% S, DS 0.17) and a 2.0 g. untreated cellulose fabric were hydroperoxidized by the method described in Example 2. The two samples were reacted with 200.0 g. of 10% aqueous acrylamide at 65–70° C. under nitrogen for 2 hours. The samples were washed thoroughly in water and were extracted in boiling water for 4 hours. The samples were then dried and weighed and the percent weight increase was:

| Sample: | Percent weight gain |
|---|---|
| Untreated-peroxide treated | 16.3 |
| Tosylated-peroxide treated | 53.5 |

In each of Examples 3 through 12, the solvent used for extraction is one which will dissolve the homopolymer of the monomer used in the example.

The necessity of attaching the peroxide groups to the backbone or host polymer is shown by the following example:

EXAMPLE 13

One 2.0 g. untreated cotton fabric (80 x 80 print cloth) was immersed in 200 cc. methanol, 80 cc. 35% hydrogen peroxide and 80 cc. distilled water for 30 minutes. The sample, after being blotted between two filter papers, was immediately immersed into 10% aqueous acrylonitrile (25.0 g. in 225 g. distilled water) which had been swept with nitrogen. The solution was maintained at 65–70° C. for two hours. Much homopolymer was formed in the solution. The treated fabric was washed well in N,N'-dimethylformamide, water, and finally extracted in N,N'-dimethylformamide at 80° C. for two hours. The percent weight gain of the sample obtained was as follows:

Percent weight gain:
  Before extraction _____ 4.92
  After extraction _____ 2.65

As indicated by the data obtained in the above examples, the amount of extraneous polymerization of monomer is minimal and virtually all of the polymerized monomer is found in the graft chains.

In addition to the specific monomers used in the above examples, the present invention may be practiced with monomers selected from the following generic structures:

| $CH_2=CHX$ | Vinyl. |
| $CH_3CH=CHX$ | Propenyl. |
| $CH_2=CX_2$ | Vinylidene. |
| $CH_2=CHCH_2X$ | Allyl. |
| $XCH=CHX$ | Vinylene. | in which X can be aryl, alkyl, alicyclic, heterocyclic groups containing cyano, amide, imide, sulfone, sulfonamide, ketone, ester, halogen, phosphonate, phosphine, alkylsilane and alkoxysilane.

Typical monomers are as follows:

| Name: | Formula: |
|---|---|
| Styrene | 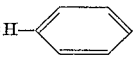 |
| Butadiene | $CH_2=CH-CH=CH_2$ |
| Vinylcyclohexene |  |
| Acrylonitrile | $CH_2=CHCN$ |
| N-vinylpyrrolidone | 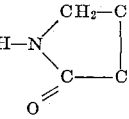 |
| Acrylamide | $CH_2=CHCONH_2$ |
| Ethyl vinyl sulfone | $CH_2=CH-SO_2C_2H_5$ |
| Vinyl sulfonamide | $CH_2=CHSO_2NH_2$ |
| Methyl vinyl ketone | $CH_2=CHCOCH_3$ |
| Ethyl acrylate | $CH_2=CHCO_2C_2H_5$ |
| Vinylidene chloride | $CH_2=CCl_2$ |
| Bis (2-chloroethyl) vinyl phosphonate. | $CH_2=CHP(OCH_2CH=CH_2)_2$ ‖ O |
| Vinyl trichlorosilane | $CH_2=CHSiCl_3$ |
| Vinyl triethoxysilane | $CH_2=CHSi(OC_2H_5)_3$ |
| Vinyl triethylsilane | $CH_2=CHSi(C_2H_5)_3$ |

As indicated above, the polymerization reaction may be initiated either by thermal means or by recourse to a redox system. If thermal initiation is used, temperatures in the range of from 60° C. to 115° C. are preferable, although temperatures as low as 40° C. are satisfactory.

Adherence to a range of temperatures based on reaction kinetics may require appropriate selection of other processing conditions. In a vapor phase reaction involving a monomer of boiling point above the temperature desired from a kinetic standpoint, reduction of pressure in the system is resorted to. On the other hand, when using a monomer having a boiling point below the desired temperature, a closed system operated at elevated pressures is used.

Where a redox system is to be used for initiating polymerization to form graft chains, typical reducing agents including the following general types may be used:

(1) Ferrous iron compounds, e.g., ferrous ammonium sulfate, $Fe(NH_4)_2(SO_4)_2 6H_2O$.
(2) Sulfur compounds ($NaHSO_3$, $Na_2S_2O_4$, $Na_2S_2O_3$, $Na_2S$).
(3) Nitrogen compounds (hydrazine and hydroxylamine).
(4) Powdered metals (iron, copper and silver).
(5) Metallic ions (stannous, cuprous, titanous and silver).
(6) Organic reducing agents (pyrogallol, hydroquinone and thioglycolic acid).

Another class of materials suitable for use in the present invention for forming graft chains are polymers which are preformed by free radical, ionic or radiation catalysis and which contain peroxide-susceptible groups in the form of residual unsaturation or hydrogen or halogen abstractable molecules.

The present invention makes possible the production of graft copolymers which exhibit chemical and physical properties which are markedly different from those of the host polymer. For example, the graft copolymers may be designed to exhibit different solubility tendencies, different resistance to acids or alkalies or different susceptibility to moisture regain. By appropriate selection of substances to form the graft chains, the host polymer may be radically changed to exhibit oil repellency, water repellency, flame retardation and other desirable properties. Likewise, the physical properties such as appearance, texture, resiliency and the like may be changed.

In the examples set forth above, a textile cellulose fabric was used to form the backbone of the graft copolymer. It is to be understood that textile cellulose in other physical forms such as fiber and yarn may also be processed in accordance with the present invention. In addition, hydroxyl-containing polymers other than cellulose may be suitably processed to achieve the desired objectives of the present invention. For example, starch, polyvinyl alcohol, hydroxyethyl cellulose, carboxymethyl cellulose and alginate fiber may also be treated in accordance with the process discussed above to form hydroperoxidized polymers which may then be used in combination with a polymerizable reactant to produce graft copolymers.

It is to be appreciated that the description set forth for the various process steps may be varied by one skilled in the art without departing from the spirit and scope of the invention.

What is claimed is:

1. The method of producing a graft copolymer having a backbone formed from a hydroxyl-containing polymer selected from the group consisting of cellulose, starch, polyvinyl alcohol, hydroxyethyl cellulose, carboxymethyl cellulose and alginate fiber comprising the steps of subjecting said polymer to an esterification reaction to replace the hydrogen atoms of at least a portion of the hydroxyl groups of said polymer with sulfonate radicals; treating the esterified polymer with a reactive peroxide under reaction conditions selected to substitute hydroperoxide radicals for at least a portion of the sulfonate radicals contained in the esterified polymer thereby forming a hydroperoxidized polymer; contacting the hydroperoxidized polymer with at least one olefinic monomer reactant which is susceptible to polymerization by the initiating radicals generated by peroxide initiators; subjecting the hydroperoxidized polymer and the said reactant to reaction conditions selected (1) to generate initiating radicals from the hydroperoxide radicals of the polymer and (2) to polymerize the said reactant, whereby the reactant is polymerized and grafted to said polymer; and maintaining the hydroperoxide polymer and said reactant under said reaction conditions until the desired graft copolymer is produced.

2. The method of producing a graft copolymer having a backbone formed from a hydroxy-containing polymer selected from the group consisting of cellulose, starch, polyvinyl alcohol, hydroxyethyl cellulose, carboxymethyl cellulose and alginate fiber comprising the steps of treating said polymer with at least one esterification reagent selected from the group consisting of alkyl sulfonyl chlorides and aryl sulfonyl chlorides under basic conditions to replace the hydrogen atoms of at least a portion of the hydroxyl groups of said polymer with sulfonate radicals; treating the esterified polymer with a reactive peroxide under reaction conditions selected to substitute hydroperoxide radicals for at least a portion of the sulfonate radicals contained in the esterified polymer to form a hydroperoxidized polymer; and contacting said hydroperoxidized polymer with at least one olefinic monomer reactant which is susceptible to polymerization by the initiating radicals generated by peroxide initiators; subjecting the hydroperoxidized polymer and the said reactant to reaction conditions selected (1) to generate initiating radicals from the hydroperoxide radicals of the polymer and (2) to polymerize the said reactant, whereby the reactant is polymerized and grafted to said polymer; and maintaining the hydroperoxide polymer and said reactant under said reaction condition until the desired graft copolymer is produced.

3. The method of producing a graft copolymer having a backbone formed from a hydroxyl-containing polymer selected from the group consisting of cellulose, starch, polyvinyl alcohol, hydroxyethyl cellulose, carboxymethyl cellulose and alginate fiber comprising the steps of treating said polymer with an esterification reagent selected from the group consisting of alkyl sulfonyl chlorides and aryl sulfonyl chlorides in the presence of an acid acceptor selected from the group consisting of alkali metal hydroxides and tertiary nitrogen bases to replace the hydrogen atoms of at least a portion of the hydroxyl groups of said polymer with sulfonate radicals; treating the esterified polymer with a reagent selected from the group consisting of hydrogen peroxide, sodium peroxide and potassium peroxide under reaction conditions selected to substitute hydroperoxide radicals for at least a portion of the sulfonate radicals contained in said polymer, thereby producing a hydroperoxidized polymer, and containing said hydroperoxidized polymer with at least one polymerizable olefinic monomer reactant which is susceptible to polymerization by the initiating radicals generated by peroxide initiators; subjecting the hydroperoxidized polymer and the said reactant to reaction conditions selected (1) to generate initiating radicals from the hydroperoxide radicals of the polymer and (2) to polymerize the said reactant, whereby the reactant is polymerized and grafted to said polymer; and maintaining the hydroperoxide polymer and said reactant under said reaction conditions until the desired graft copolymer is produced.

4. The graft copolymer produced by the method of claim 3.

5. The method of producing a graft copolymer having a backbone formed from a hydroxyl-containing polymer comprising the steps of providing a polymer selected from the group consisting of cellulose, starch, polyvinyl alcohol, hydroxyethyl cellulose, carboxymethyl cellulose, and alginate fibers; treating said polymer with an esterification reagent selected from the group consisting of alkyl sulfonyl chlorides and aryl sulfonyl chlorides in the presence of an acid acceptor to replace the hydrogens of at least a portion of the hydroxyl groups of said polymer with sulfonate radicals; treating the esterified polymer with a reactive peroxide under reaction conditions selected to substitute hydroperoxide radicals for at least a portion of the sulfonate radicals contained in said esterified polymer to form a hydroperoxidized polymer; and contacting the hydroperoxidized polymer with at least one olefinic monomer reactant which is susceptible to polymerization by the initiating radicals generated by peroxide initiators; subjecting the hydroperoxidized polymer and the said reactant to reaction conditions selected (1) to generate initiating radicals from the hydroperoxide radicals of the polymer and (2) to polymerize the said reactant, whereby the reactant is polymerized and grafted to said polymer; and maintaining the hydroperoxide polymer and said reactant under said reaction conditions until the desired graft copolymer is produced.

6. The method of producing a graft copolymer having a backbone formed from cellulose, comprising the steps of treating said cellulose with an esterification reagent selected from the group consisting of alkyl sulfonyl chlorides and aryl sulfonyl chlorides under esterifying conditions to replace the hydrogen atoms of at least a portion of the hydroxyl groups of said cellulose with sulfonate radicals; treating the esterified cellulose with a reactive peroxide under reaction conditions selected to substitute hydroperoxide radicals for at least a portion of the sulfonate radicals to produce hydroperoxidized cellulose; and contacting said hydroperoxidized cellulose with at least one olefinic monomer reactant which is susceptible to polymerization by the initiating radicals generated by peroxide initiators; subjecting the hydroperoxidized cellulose and the said reactant to reaction conditions selected (1) to generate initiating radicals from the hydroperoxide radicals of the cellulose and (2) to polymerize the said reactant, whereby the reactant is polymerized and grafted to said cellulose; and maintaining the hydroperoxide cellulose and said reactant under said reaction conditions until the desired graft copolymer is produced.

7. The graft copolymer produced by the method of claim 6.

8. The method of producing a graft copolymer having a backbone formed from cellulose comprising the steps of treating said cellulose with an esterification reagent selected from the group consisting of alkyl sulfonyl chlorides and aryl sulfonyl chlorides, under esterifying conditions and in the presence of a swelling solvent for cellulose, to replace the hydrogen atoms of at least a portion of the hydroxyl groups of said cellulose with sulfonate radicals; treating the esterified cellulose with a reactive peroxide under reaction conditions selected to substitute hydroperoxide radicals for at least a portion of the sulfonate radicals in said esterified cellulose to produce hydroperoxidized cellulose; and contacting the hydroperoxidized cellulose with at least one olefinic monomer reactant which is susceptible to polymerization by the initiating radicals generated by peroxide initiators; subjecting the hydroperoxidized cellulose and the said reactant to reaction conditions selected (1) to generate initiating radicals from the hydroperoxide radicals of the cellulose and (2) to polymerize the said reactant, whereby the reactant is polymerized and grafted to said cellulose; and maintaining the hydroperoxide cellulose and said reactant under said reaction conditions until the desired graft copolymer is produced.

9. The method of claim 8 in which said esterification reagent is p-toluene sulphonyl chloride; and in which said reactive peroxide is hydrogen peroxide.

10. The method of claim 8 in which said cellulose is treated with said esterification reagent to provide a product having a DS in the range of from about .02 to .30.

11. The method of producing a graft copolymer having a backbone formed from cellulose comprising the steps of treating said cellulose with an esterification reagent selected from the group consisting of alkyl sulfonyl chlorides and aryl sulfonyl chlorides in the presence of an acid acceptor and a swelling solvent for cellulose, to replace the hydrogen atoms of at least a portion of the hydroxyl groups of said cellulose with sulfonate radicals; continuing said last-named treatment until the cellulose has a DS in the range of from about .10 to .20; treating the esterified cellulose with a reactive peroxide selected from the group consisting of hydrogen peroxide, sodium peroxide and potassium peroxide in a reaction medium having a pH above about 12 and under reaction conditions selected to substitute hydroperoxide radicals for at least a portion of the sulfonate radicals in said esterified cellulose thereby producing hydroperoxidized cellulose; and contacting said hydroperoxidized cellulose with at least one olefinic monomer reactant which is susceptible to polymerization by the initiating radicals generated by peroxide initiators; subjecting the hydroperoxidized cellulose and the said reactant to reaction conditions selected (1) to generate initiating radicals from the hydroperoxide radicals of the cellulose and (2) to polymerize the said reactant, whereby the reactant is polymerized and grafted to said cellulose; and maintaining the hydroperoxide cellulose and said reactant under said reaction conditions until the desired graft copolymer is produced.

12. A method for the production of graft copolymers having a backbone formed from cellulose comprising the steps of treating said cellulose with an esterification reagent selected from the group consisting of alkyl sulfonyl chlorides and aryl sulfonyl chlorides to convert hydroxyl groups of said cellulose to sulfonate groups; reacting the cellulose so treated with hydrogen peroxide to form cellulose hydroperoxide; and contacting the cellulose hydroperoxide with a polymerizable olefinic monomer under polymerizing conditions to form a graft copolymer.

13. The method of producing a graft copolymer having a backbone formed from a hydroxyl-containing polymer selected from the group consisting of cellulose, starch, polyvinyl alcohol, hydroxyethyl cellulose, carboxymethyl cellulose and alginate fiber comprising the steps of subjecting said polymer to an esterification reaction to replace the hydrogen atoms of at least a portion of the hydroxyl groups of said polymer with sulfonate radicals; treating the esterified polymer with a reactive peroxide under reaction conditions selected to substitute hydroperoxide radicals for at least a portion of the sulfonate radicals contained in the esterified polymer thereby forming a hydroperoxidized polymer; contacting the hydroperoxidized polymer with at least one olefinic monomer which is susceptible to polymerization by the initiating radicals generated by peroxide initiators, introducing a reducing agent to form a redox system, subjecting said hydroperoxidized polymer, said monomer and said reducing agent to reaction conditions to polymerize said monomer, whereby said monomer is polymerized and grafted to said polymer, and maintaining said reaction conditions until the desired graft copolymer is produced.

14. The method of producing a graft copolymer having a backbone formed from a hydroxyl-containing polymer selected from the group consisting of cellulose, starch, polyvinyl alcohol, hydroxyethyl cellulose, carboxymethyl cellulose and alginate fiber comprising the steps of subjecting said polymer to an esterification reaction to replace the hydrogen atoms of at least a portion of the hydroxyl groups of said polymer with sulfonate radicals; treating the esterified polymer with a reactive peroxide under reaction conditions selected to substitute hydroperoxide radicals for at least a portion of the sulfonate radicals contained in the esterified polymer thereby forming a hydroperoxidized polymer; contacting the hydroperoxidized polymer with at least one olefinic monomer which is susceptible to polymerization by the initiating radicals generated by peroxide initiators, subjecting the hydroperoxidized polymer and the said monomer to reaction conditions selected (1) to generate initiating radicals from the hydroperoxide radical of the polymer by thermal activation and (2) to polymerize said monomer, whereby the monomer is polymerized and grafted to said polymer, and maintaining said reaction conditions until the desired graft copolymer is produced.

15. The method of claim 14 in which the said monomer is in the vapor phase during the polymerization and grafting step.

16. The method of producing a graft copolymer having a backbone formed from textile cellulose comprising the steps of subjecting said textile cellulose to an esterification reaction to replace the hydrogen atoms of at least a portion of the hydroxyl groups of said textile cellulose with sulfonate radicals; treating the esterified textile cellulose with a reactive peroxide under reaction conditions selected to substitute hydroperoxide radicals for at least a portion of the sulfonate radicals contained in the esterified textile cellulose thereby forming a hydroperoxidized textile cellulose; contacting the hydroperoxidized textile cellulose with at least one olefinic monomer reactant which is susceptible to polymerization by the initiating radicals generated by peroxide initiators; subjecting the hydroperoxidized textile cellulose and the said reactant to reaction conditions selected (1) to generate initiating radicals from the hydroperoxide radicals of the textile cellulose and (2) to polymerize the said reactant, whereby the reactant is polymerized and grafted to said polymer; and maintaining the hydroperoxide textile cellulose and said reactant under said reaction conditions until the desired graft copolymer is produced.

References Cited

UNITED STATES PATENTS

| | | | |
|---|---|---|---|
| 3,138,564 | 6/1964 | Borunsky | 260—17 |
| 3,298,979 | 1/1967 | Hagemeyer et al. | 260—17 |
| 3,332,897 | 7/1967 | Chandhuri | 260—17 |

OTHER REFERENCES

Ott, E., "Cellulose," page 608, Interscience 1946.

Krassig et al., Advances in Polymer Science, 4, 126–7 (1965).

WILLIAM H. SHORT, Primary Examiner

E. NIELSEN, Assistant Examiner

U.S. Cl. X.R.

8—116; 260—17, 17.4

PO-1050
(5/69)

UNITED STATES PATENT OFFICE
CERTIFICATE OF CORRECTION

Patent No. 3,492,082          Dated January 27, 1970

Inventor(s) Wing Kai Lee

It is certified that error appears in the above-identified patent and that said Letters Patent are hereby corrected as shown below:

Column 2, line 42, "cellulose-water" should read --cellulose - water--; lines 42 and 43, each instance, "N,N'-" should read --N,N- --; line 65, the formula should read $$DS = \frac{1.62(\%S)}{32-1.54(\%S)}$$

Column 5, lines 39 and 40, each instance, "N,N'-" should read --N,N- --. Column 6, lines 4, 21 and 51, each instance, "Example 2" should read --Example 3--; line 8, "methylmethacrylate" should read --methyl methacrylate--; line 18, after "with" insert --a--; line 48, after "reacted" insert --with--; line 52 both instances, and line 75, one instance, "N,N'-" should read --N,N- --. Column 7, lines 19 and 20, each instance, "N,N'-" should read --N,N- --. Column 8, lines 10 and 11, each instance, "N,N'-" should read --N,N- --; line 31, line 31, "alicylic" should read --alicyclic--. Column 10, line 47, "containing" should read --contacting--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents